United States Patent
Sharifi

(10) Patent No.: US 10,515,133 B1
(45) Date of Patent: Dec. 24, 2019

(54) SYSTEMS AND METHODS FOR AUTOMATICALLY SUGGESTING METADATA FOR MEDIA CONTENT

(71) Applicant: Google LLC, Mountain View, CA (US)

(72) Inventor: Matthew Sharifi, Palo Alto, CA (US)

(73) Assignee: Google LLC, Mountain View, CA (US)

(*) Notice: Subject to any disclaimer, the term of this patent is extended or adjusted under 35 U.S.C. 154(b) by 324 days.

(21) Appl. No.: 14/298,505

(22) Filed: Jun. 6, 2014

(51) Int. Cl.
```
G06F 16/958      (2019.01)
G06F 16/953      (2019.01)
G06F 16/908      (2019.01)
G06F 16/28       (2019.01)
G06F 16/2457     (2019.01)
```

(52) U.S. Cl.
CPC ...... *G06F 16/958* (2019.01); *G06F 16/24575* (2019.01); *G06F 16/285* (2019.01); *G06F 16/908* (2019.01); *G06F 16/953* (2019.01)

(58) Field of Classification Search
None
See application file for complete search history.

(56) References Cited

U.S. PATENT DOCUMENTS

| | | | | |
|---|---|---|---|---|
| 8,745,206 B1* | 6/2014 | Chang | ................. | H04L 67/22 709/223 |
| 9,846,898 B2* | 12/2017 | Rehman | ................. | G06Q 30/06 |
| 2005/0015712 A1* | 1/2005 | Plastina | ................. | G06F 17/30038 715/230 |
| 2005/0065928 A1* | 3/2005 | Mortensen | ................. | G06F 16/335 |
| 2009/0198732 A1* | 8/2009 | Ross | ................. | G06F 17/30011 |
| 2011/0078729 A1* | 3/2011 | LaJoie | ................. | G11B 27/28 725/36 |
| 2012/0110043 A1* | 5/2012 | Cavet | ................. | G06F 17/30781 707/825 |
| 2014/0172874 A1* | 6/2014 | Rober | ................. | G06F 17/30867 707/748 |

* cited by examiner

*Primary Examiner* — Charles D Adams
(74) *Attorney, Agent, or Firm* — Byrne Poh LLP

(57) ABSTRACT

Systems and methods for generated suggested metadata for media items are provided herein. In particular, users can upload media items to a system. The media items can be matched to reference media items, classified, and/or analyzed to identify characteristics. Suggested metadata can be determined based on the matched reference media items, classifications, and analysis. The suggested metadata can be presented to a user for user selection. Media items can be published and associated metadata can provide searchable criteria.

21 Claims, 12 Drawing Sheets

US 10,515,133 B1

SYSTEMS AND METHODS FOR AUTOMATICALLY SUGGESTING METADATA FOR MEDIA CONTENT

TECHNICAL FIELD

This disclosure generally relates to generating suggested meta data for media content.

BACKGROUND

The proliferation of available media items is increasing at exponential levels that will soon reach many millions if not billions of items of such viewable media content. This has resulted in exceptional growth of available media items. Web sites for sharing of digital media items, such as digital music and video files, have become commonplace. The web sites may be accessed to upload music and video files, and to find music and video files to download, listen to, or view, as authorized. Often, users of such web sites provide descriptive terms for the music and video files when uploading the files to the web sites. The descriptive terms can facilitate appropriately categorizing and storing of the uploaded files, for example. Other times users may provide no descriptive terms or inaccurate descriptive terms, such as computer generated file names (e.g., movie1234).

There may be no particular restrictions placed on the descriptive terms, and so the descriptive terms can be as varied as the users who think them up. For example, one user might describe an uploaded music or video file in terms of a full title and artist name, while another user might describe an uploaded file in terms of a partial title and a venue where a live performance took place, and so on.

Descriptive terms can be utilized to located or access a media item when a user searches a web site. If descriptive terms are inaccurate or lacking specificity, a media item may become difficult to locate.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to generating suggested metadata for media content. Media content can be received at an upload time. The media content can be compared to reference media content. Comparison can comprise generating fingerprints representing the media content or portions of the media content. The fingerprints can be compared to reference fingerprints associated with reference media items. The media content or portions of the media content can be matched with the reference media content or portions of the reference media content. Metadata can be suggested or automatically attached to the media content based on the matching.

Other embodiments relate to methods for automatically generating suggested metadata for media content. A user can upload media content to a system. The uploaded media content can be compared to reference media items to identify matches or partial matches to the media content. Metadata can be suggested, based on the comparison, for the uploaded media content. A user can provide input to alter the suggested metadata, accepted the suggested metadata, or provide additional metadata. The uploaded media content can be referenced based on the metadata.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
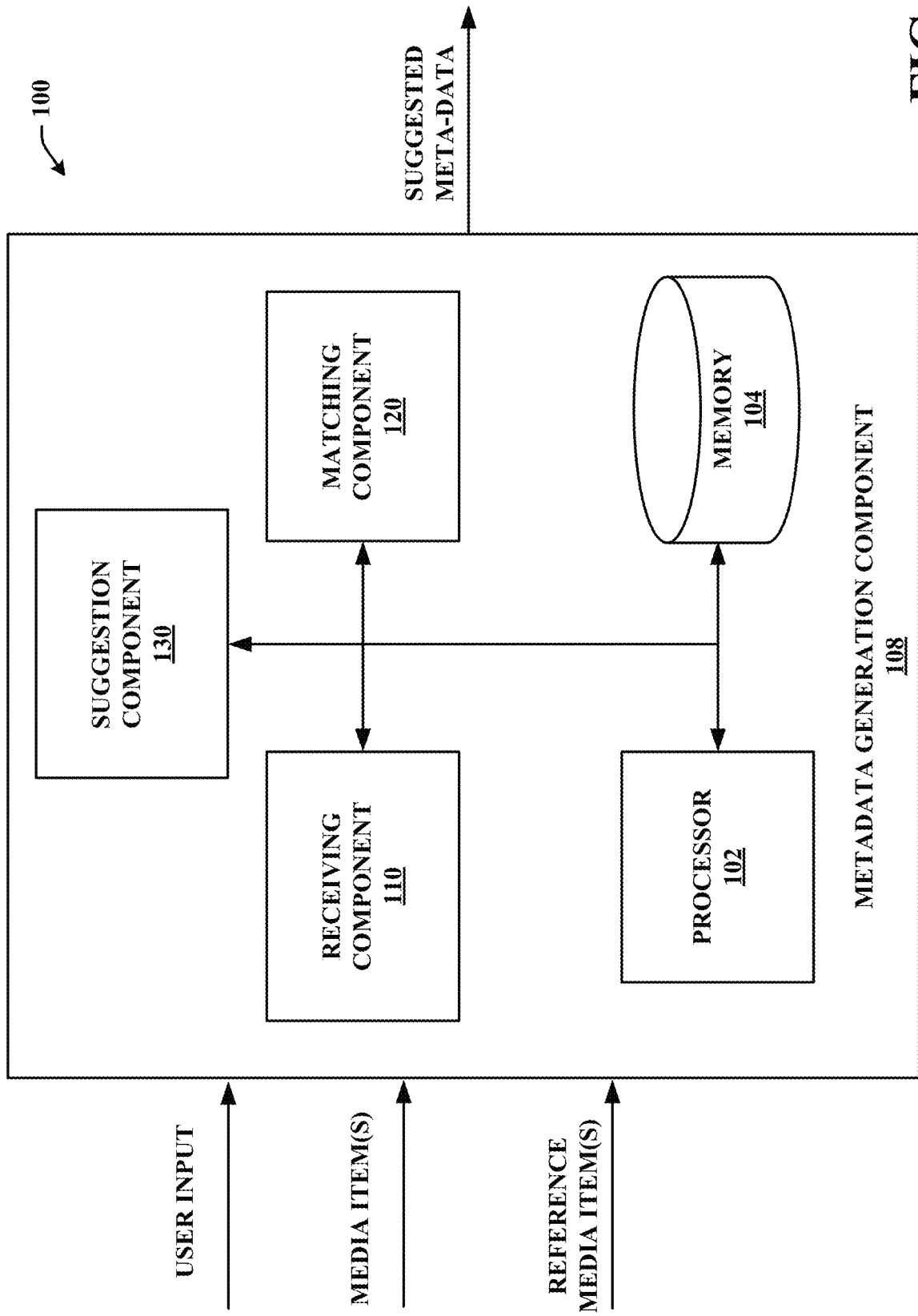
FIG. 1 illustrates a high-level block diagram of an example system that can generate suggested metadata for media items based on metadata of matching media items in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server. Moreover, one or more implementations described herein can provide for anonymizing collected, received, or transmitted data.

Terms such as "user equipment," "user equipment device," "mobile device," "user device," "handset," or terms representing similar terminology can refer to a device utilized by a subscriber or user to receive data, convey data, control, voice, video, sound, models, gaming, and the like. The foregoing terms are utilized interchangeably herein and with reference to the related drawings.

Furthermore, the terms "user," "subscriber," "customer," "consumer," "end user," and the like are employed interchangeably throughout, unless context warrants particular distinctions among the terms. It should be appreciated that such terms can refer to human entities, human entities represented by user accounts, or automated components supported through artificial intelligence (e.g., a capacity to make inference based on complex mathematical formalisms), which can provide simulated vision, sound recognition and so forth.

As used herein, terms such as "media content," "media item," "media upload," and the like are employed interchangeably throughout, unless context warrants particular distinctions among the terms. It should be appreciated that such terms can refer to video items, audio items, combinations of video and audio, textual items, images, or other performable media items.

In accordance with one or more implementations described in this disclosure, a system, such as a metadata generation system, can automatically generate suggested metadata for media items. In some embodiments, the suggested metadata can be generated in response to receiving a media item. Suggested metadata can comprise viewable or searchable metadata such as tags, titles, and the like.

A receiving component can receive one or more media items at an upload time. The media item can be uploaded based on user input or can be automatically uploaded to a system. In some embodiments, the receiving component can receive one or more media items that have been previously uploaded, such as media items stored in a database.

A matching component can match a media item with reference media items. Reference media items can be comprised within a media store, such as a media item database. The matching component can determine matches based on a comparison of media items to reference media items or based on user input. In one example, a fingerprint can be generated for a received media item. The fingerprint can be compared with reference fingerprints associated with reference media items to identify matches or partial matches.

In another aspect, a content identification component can classify media items based on feature identification, location data, header information, video titles, and the like. For example, a content identification component can utilize classifiers to identify features of a media item such as "surfing." In another aspect, location data can be utilized to determine a location associated with the media item.

A suggestion component can generate suggested metadata for a media item based on the matching, feature identification, location data, header information, video titles, or the like. In an aspect, if a matched media item is identified, the suggestion component can determine to utilize some or all of metadata associated with a matching reference media item for the media item. In another aspect, the suggestion component can suggest metadata based on identifying a subject of a media item through pattern recognition, location data, and the like. In various embodiments, the suggestion component can generate suggested metadata based on multiple reference media items or identified features. For example, a media item can comprise clips or portions of multiple reference media items. The suggestion component can identify common characteristics or features of the multiple reference media items and can generate suggested metadata based on the common characteristics or features.

In accordance with various implementations described in this disclosure, a method can generate suggested metadata for a media upload. The suggested metadata can comprise tags, titles, or other metadata utilized for searching or querying a database. In an aspect, the suggested metadata can be generated based on metadata of other media items or portions of other media items that are determined to match the media upload or portions of the media upload. Suggested metadata can be automatically associated with the media upload or can be presented to a user for selection or editing.

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

Referring now to FIG. 1, a system 100 is depicted. System 100 can generate suggested metadata for media items based on metadata of matching media items. Embodiments disclosed herein, for example, can receive a media item and determine whether a reference media item matches, at least in part, the media item. If a reference media item is identified as matching, metadata of the matched reference item can be utilized to generate suggested metadata for the media item. Such can improve user satisfaction, increase accuracy of search results, increase visibility of media items, and provide for a more efficient media content sharing system.

System 100 can include a memory 104 that stores computer executable components and a processor 102 that executes computer executable components stored in the memory 104. It is to be appreciated that the system 100 can be used in connection with implementing one or more of the systems or components shown and described in connection with other figures disclosed herein. It is noted that all or some aspects of system 100 can be comprised in larger systems such as servers, computing devices, smart phones, and the like. As depicted, system 100 can include a metadata generation component 108 that primarily includes a receiving component 110 (which can receive media items), a matching component 120 (which can identify matching media items), and a suggestion component 130 (which can generate suggested metadata for media items).

Receiving component 110 can receive input such as user input, media items, and the like. In embodiments, receiving component 110 can receive media items in response to uploading of the media item by a user. In some embodiments, receiving component 110 can receive media items automatically (e.g., automatic upload without user input), from a data store, and the like. In an example, a user can select a video item to upload to a video sharing system. The user can select the video item by name (e.g., file location/path) or by any other means. Once selected, the video can be transmitted to receiving component 110. It is noted that in some embodiments a user can utilize a user equipment device to transmit the video to receiving component 110 on a disparate device. It is further noted that in other embodiments, the receiving component 110 can be comprised within the user equipment device.

In some embodiments, receiving component 110 can determine whether previously uploaded media items should be assigned new metadata. For example, a previously uploaded video that has not been seen, searched for, appeared as a search result, appeared in the top i search results (where i is an integer), or the like for a defined period of time may have inaccurate, incomplete, or otherwise ineffective metadata. The video can be selected for generating new suggested metadata, which can be automatically generated and/or presented to a user for user input. In embodiments, the previously uploaded media item can be automatically selected or can be manually selected.

Matching component 120 can utilize matching schemes to identify matching media items. For example, matching component 120 can match a media item, received by receiving component 110, with reference media items. In various embodiments, the matching component 120 can determine matches based on comparison of compact descriptors (e.g., fingerprints) that comprise representations of media items along one or more channels. In an aspect, matching component 120 can determine a fingerprint for media items (e.g., a received media item) or can receive a fingerprint from a memory store. One method of calculating fingerprints is to first calculate individual interest points that identify unique characteristics of local features of the time-frequency representation of the reference sample. Fingerprints can then be computed as functions of sets of interest points.

Calculating interest points can include identifying unique characteristics of a spectrogram. For example, an interest point can be a spectral peak of a specific frequency over a specific window of time. As another non-limiting example, an interest point can also include timing of the onset of a note. Any suitable unique spectral event over a specific duration of time can constitute an interest point.

In embodiments, matching component 120 can determine media item matches, for example, by analyzing a media or video for unique characteristics that can be used in comparison to unique characteristics among one or more reference media items or fingerprints among a data store. A spectrogram or a window of a spectrogram, for example, can be also used in the comparison of the video/media to identify a video/media sample, in which the spectrogram represents a video/media sample by plotting time on one axis and frequency or other parameter on another axis.

Because storing an entire spectrogram for multiple reference samples may not be efficient, compact descriptors of reference samples can be utilized to identify near duplicates or nearly identical versions of the same media item. Even though a variety of references could be near matches, some of the near matches may not be correct matches. It is noted that there may be multiple correct matches, such as when a media item has multiple duplicate media items or comprises multiple clips from various matching media items. In a media matching system, for example, the system can match the media of a sample, e.g., a user uploaded video/media clip, against a set of references, allowing for a match in any range of the probe sample and a reference sample. Thus, descriptors of the sample are generated based on snapshots (or subsets of correlated sample data—e.g., a spectrogram window) of the sample at different times, which are looked up in an index of corresponding snapshots (or fingerprints) from reference samples. When a sample has multiple matching snapshot pairs, they can be combined during matching to time align the sample and reference sample and generated a consolidated fingerprint.

In some embodiments, matching component 120 can be tuned to match the entirety of a media clip, e.g., finding full duplicates. For example, a media matching system can be used to discover the identity of a full media item in a user's collection of media against a reference database of known media items. Such a system could be useful for any cloud media service to allow a user to match their collection against a set of known media items. In another example, a media matching system can be used to discover duplicates within a large data store or collection of media subsets, for example. In yet another example, a media matching system can be used for clustering together multiple user recordings. Using descriptors capable of matching any range of a probe sample to any range of a reference sample, could work for the previous examples; however, using more compact descriptors for the purpose of matching an entire media subset (e.g., song track, or the like or digest of media subsets) can be more efficient and allow the system to scale to billions of reference samples.

It is noted that media items or portion of media items can be manually matched with reference media items. For example, a user can indicate that an uploaded video file comprises clips from reference media items, such as video clips, audio files, and the like.

Suggestion component 130 can generate suggested metadata for media items. Suggested metadata can comprise a suggested title, keyword, key phrase, tag, or the like. In an aspect, suggestion component 130 can generate the suggested metadata based on metadata of matched media items. For example, a user can upload a video item. The user may or may not enter metadata, such as a title or key word. One or more reference video items can be identified as matching video items for the uploaded video item. Metadata for the one or more video items can be utilized as metadata for the uploaded video item.

In an embodiment, suggestion component 130 can copy some or all of the metadata of a reference media item as metadata for a received media item. For example, a user may upload a video of a portion of a television show. Matching component 120 can identify a reference media item as comprising all or a portion of the video upload. The reference media item can be associated with metadata such as a title (e.g., "episode 10 of the show") as well as other metadata such as key words/phrases (e.g., "sitcom," "actor name", etc.). Suggestion component 130 can suggest a title such as "clip from episode 10 of the show," and/or key words/phrases, such as "sitcom," and "actor name." It is noted that "copying metadata" can refer to extracting all or a portion of metadata from one media item to use as metadata for another media item.

In various embodiments, suggestion component 130 can generate metadata for a media item based on multiple reference media items that are determined to match, at least in part, the media item. In embodiments, suggestion component 130 can identify common features of the reference media items. The common features can comprise common metadata, characteristics, or the like. For example, suggestion component 130 can identify that the reference media items comprise a common actor, director, artist, composer, show, season, game (e.g., video game), classification (e.g., basketball, football, school play, etc.), theme (e.g., comedy, drama, science fiction, history, science, etc.), location, event, or other identifiable aspect.

As an example, a user can upload a media item comprising multiple clips of video (e.g., video clips from multiple sources that are aggregated into one aggregate video item or mash up video item). In another aspect, the media item can also comprise an audio track (e.g., song X by artist Y). Matching component 120 can identify reference media items associated with the various clips of the mash up media item and can identify the audio track associated with the mash up media item. In the above example, suggestion component 130 can generate suggested metadata based on the matched reference media items, such as a summary title (e.g., a composite title) and/or summary of key words/phrases.

A summary title can comprise key or common phrases, features, or aspects of the reference media items. As an example, the summary title can be in the form of "best of show W," "clips starring actor A," "highlights from show W season B," "Clips from episodes 1, 2, 3, 4, 5, of season 7," or the like. It is noted that the summary title can comprise other forms. In another aspect, a summary of key words can comprise a common actor, show, location, classification, or the like.

In an example embodiment, a user can upload multiple media items relating to a common event. Receiving component 110 can receive the multiple media items and determine the media items are related, such as based on information associated with capturing the media item (e.g., time of capture, place of capture, etc.), comparison of the media items (e.g., via matching component 120), user input, upload time, and the like. It is noted that the media items can be uploaded simultaneously, substantially simultaneously, at overlapping times, or at disparate times. In some embodiments, a user can upload a media item and the media item can be divided or split into multiple media items. Suggestion component 130 can generate suggested metadata based on identifying a relationship between the media items. For example, suggestion component 130 can generate suggested titles for the media items, such as "Surfing at Santa Cruz part 1," "Surfing at Santa Cruz part 2", and the like.

In some embodiments, if the related media items are uploaded at disparate times, suggestion component 130 can suggest alterations for metadata of previously uploaded media items. For example, a user can upload a first media item entitle "Surfing at Santa Cruz". Subsequently, the user can upload a second media item related to the first media item and suggestion component 130 can generate suggested metadata for the second media item as well as suggested alterations of metadata for the first media item. The suggested alteration can be comprised within a message or notification, such as "Would you like to change the title of 'Surfing at Santa Cruz' to 'Surfing at Santa Cruz part 1'?". Receiving component 110 can receive a user's response and implement the alteration based on the generated metadata and/or user input associated with altering the metadata.

In various embodiments, matching component 120 can identify matches per channel (e.g., audio channel, video channel, etc.) or per portions of a media item (e.g., clip). Suggestion component 130 can generate suggested metadata based on the matched channels or portions. In an example, suggestion component 130 can generate suggested metadata as the title "clips from W with music X".

In embodiments, suggestion component 130 can cap a length (e.g., character length) of suggested metadata. For example, a media item can comprise clips from multiple episodes of a series, multiple events, multiple audio tracks, and the like. Suggestion component 130 can generate a title as a list of all episodes, events, or audio tracks until a defined threshold is reached. In an aspect, the defined threshold can comprise a number of episodes, events, or audio tracks, a number of characters, and the like. In another example, if the threshold is reached, the suggestion component 130 can determine to utilize a shortened title, such as "clips of episodes from seasons 1 and 2" in place of "clips from episode 1 of season 1, episode 2 of season 1, episode 1 of season 2, etc."

In another aspect, suggestion component 130 can generate inferences based on the matched reference media items. The inferences can be utilized to determine a common theme or aspect of a media upload. For example, a user can upload a video item that comprises video clips of various subjects, such as video highlights from different events. More particularly, a video can comprise clips from multiple sporting events. Suggestion component 130 can determine a common theme, such as top draft prospects for a sports draft. Based on the common theme, suggestion component 130 can generate a suggested title as "top draft prospects for 2014 draft." In another example, a media item can comprise various audio tracks that may not share a common artist. Suggestion component 130 can generate an inference that relates the audio tracks and generate suggested metadata, such as "top 10 songs of 2013," "top pop songs," "number 1 hits from the 2000's," and the like. It is noted that suggestion component 130 can utilize metadata associate with media items (e.g., release data, artist, etc.), databases (e.g., music charts, sports charts, or other specialized databases), and the like to generate inferences.

In order to provide for or aid in the numerous inferences described herein, suggestion component 130 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In various aspects, suggested metadata can be automatically associated with a media item upload. For example, the suggested metadata can populate an unspecified title field, key word field, or other field associated with metadata of the media item upload. In another aspect, the suggested metadata can be presented to a user (e.g., via an interface). The user can determine whether to accept, alter, or reject the suggested metadata. As another example, if a user does not provide input, such as a user generated title or tags, automatically generated metadata can be utilized.

Figure 2:
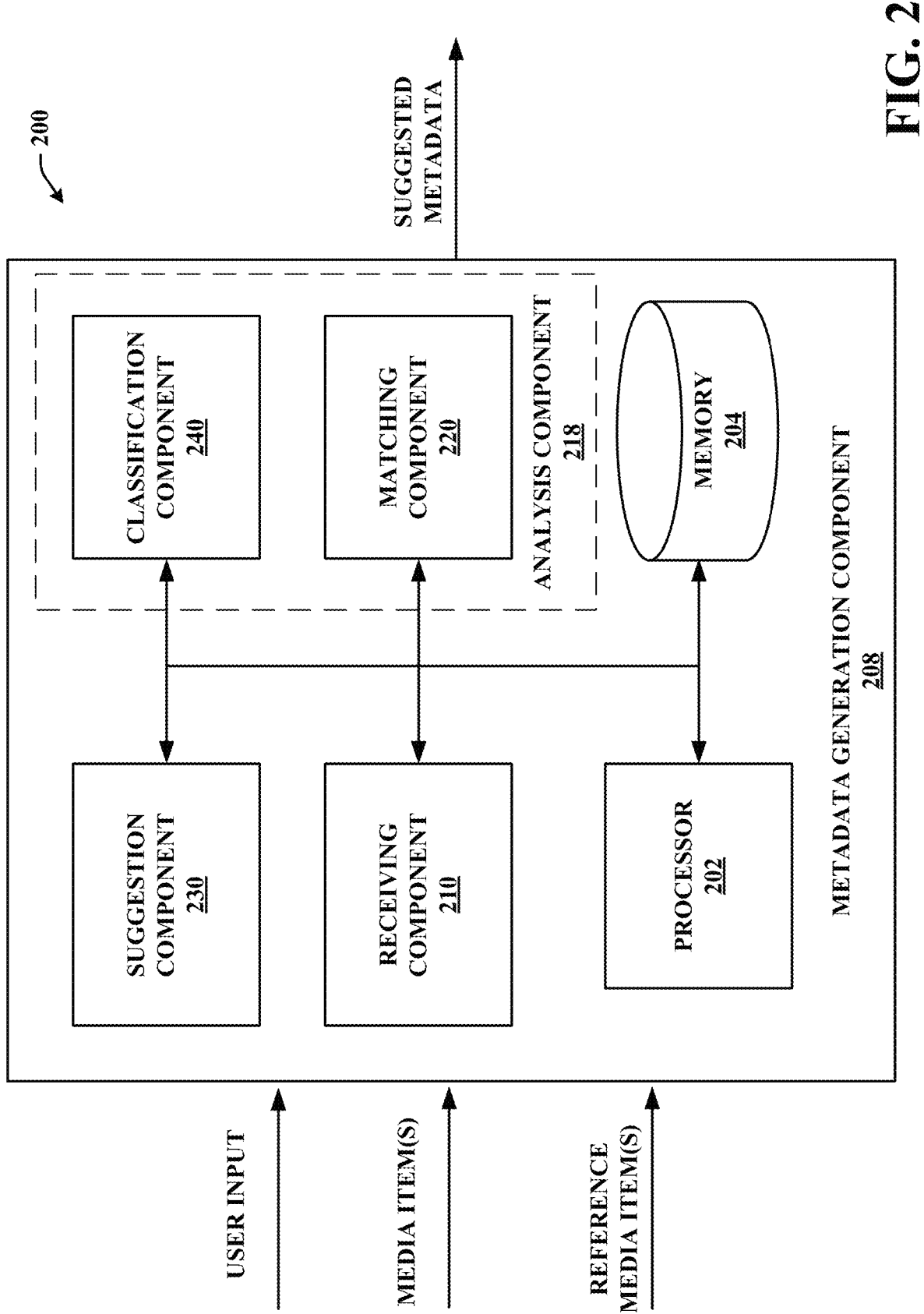
FIG. 2 illustrates a high-level block diagram of an example system that can generate suggested metadata based on matched media items or classifications in accordance with certain embodiments of this disclosure.

Referring now to FIG. 2, system 200 is depicted. System 200 can generate suggested metadata based on matched media items or classifications. System 200 can include all or portions of other systems as described previously, or other systems or components detailed herein.

System 200 can include a memory 204 that stores computer executable components and a processor 202 that executes computer executable components stored in the memory 204. It is to be appreciated that the system 200 can be used in connection with implementing one or more of the systems or components shown and described in connection with other figures disclosed herein. It is noted that all or some aspects of system 200 can be comprised in larger systems such as servers, computing devices, smart phones, and the like. As depicted, system 200 can include a metadata generation component 208 that primarily includes a receiving component 210 (which can receive user input and media items), a suggestion component 230 (which can generate suggested metadata), and an analysis component 218 (which can match media items and classify media items). The analysis component 218 can primarily comprises a matching component 220 (which can identify matching media items) and a classification component 240 (which can classify media items). It is noted that similarly named components of system 200 and other systems disclosed herein can include similar functionality unless context suggests otherwise.

In an aspect, receiving component 210 can receive one or more media items. In response to receiving the one or more media items, matching component 220 can determine whether the one or more media items match reference media items (e.g., media items stored in a database). As noted supra, matching component 220 can utilize various techniques for identifying matched media items or partial matched media items. One technique can include comparing fingerprints (or partial fingerprints) of received media items with fingerprints of reference media items. If matches are identified, suggestion component 230 can generate suggested metadata based on the matched reference media items or data describing the matched reference media items.

In various embodiments, matching component 220 can determine that no matching reference media items exist and/or no matches meet a defined confidence score. Classification component 240 can perform content analysis on the media content to classify content and can analyze information associated with the media content, such as information stored in a header of a media item, a title of a media item on a user equipment device, a location of a media item in a data store (e.g., "C:\user\videos\2014 San Diego Zoo Trip"), and the like.

Classification component 240 can comprise a content-based classifier that can be trained on audio, video, or image features. In an aspect, the content-based classifier can identify high level concepts in a media item. In various aspects, the content-based classifier can identify a location, a subject, or the like. For example, classification component 240 can determine that a media item comprises a video of a person surfing in Santa Cruz. It is noted that classification component 240 can perform content analysis in combination with matching component 220 identifying matched reference media items. For example, matching component 220 can identify reference media items that match one or more clips or channels of a media item and can determine that one or more other clips or channels of the media item are not matched to reference media items.

Suggestion component 230 can generate suggested metadata based on the content analysis and information related to the media item. In an aspect, the metadata can comprise a suggested title, such as "Surfing at Santa Cruz." In various embodiments, suggestion component 230 can generate suggested metadata based on a combination of matching reference media items and content analysis. For example, suggestion component 230 can generate metadata comprising metadata associated with matched reference media items and generated classifications. As an example, the suggested metadata can comprise the title "Surfing at Santa Cruz with Song X by Artist Y".

In some embodiments, classification component 240 can be trained for identifying specialized features based on a determined classification. For example, classification component 240 can comprise various content-based classification models specifically trained for identifying content associated with sporting events, audio, performances, and the like. In an example, classification component 240 can comprise a specialized content-based classifier trained to identify content associated with soccer. In this example, the specialized content-based classifier can determine that respective video clips of a media item relate to soccer goals. In another aspect, the content-based classifier can further determine that the soccer goals related to a particular team, player, season, or the like. For example, the specialized content-based classifier can identify a jersey, logo, player number, or other identifiable pattern comprised in the media content. Suggestion component 230 can utilize the identified features to generate a suggested title such as "Soccer goals scored by Player Name during the 2013 season."

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed.

Figure 3:
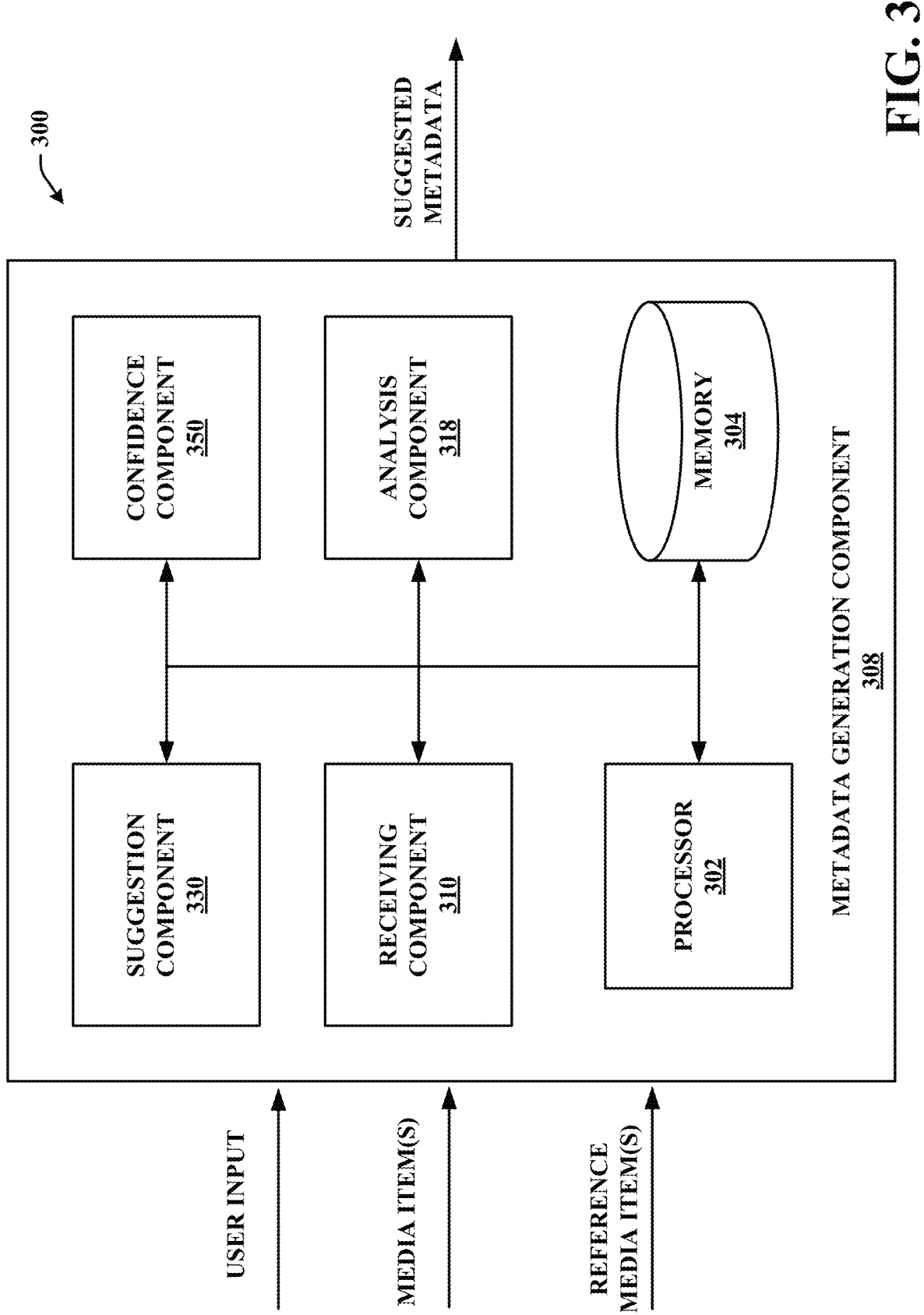
FIG. 3 illustrates a high-level block diagram of an example system that can generate suggested metadata and confidence scores for the suggested metadata in accordance with certain embodiments of this disclosure.

Referring now to FIG. 3, system 300 is depicted. System 300 can generate suggested metadata and confidence scores for the suggested metadata. System 300 can include all or portions of other systems as described previously, or other systems or components detailed herein.

System 300 can include a memory 304 that stores computer executable components and a processor 302 that executes computer executable components stored in the memory 304. It is to be appreciated that the system 300 can be used in connection with implementing one or more of the systems or components shown and described in connection with other figures disclosed herein. It is noted that all or some aspects of system 300 can be comprised in larger systems such as servers, computing devices, smart phones, and the like. As depicted, system 300 can include a metadata generation component 308 that primarily includes a receiving component 310 (which can receive media items and user input), an analysis component 318 (which can identify matching media items and/or generate classifications), a suggestion component 330 (which can generate suggested metadata), and a confidence component 350 (which can generate confidence scores associated with suggested metadata). It is noted that similarly named components of system 300 and other systems disclosed herein can include similar functionality unless context suggests otherwise.

In one or more other embodiments, confidence component 350 can determine a confidence score representing a level of confidence in the correctness or appropriateness of suggested metadata. For example, confidence component 350 can determine confidence scores for various generated titles, key words/phrases, or other searchable metadata. In some embodiments, confidence component 350 can determine a confidence score of user entered metadata. It is noted that a confidence score for the user entered metadata can be determined before, during, or after generating a score of suggested metadata. In this way, a user can determine correctness or appropriateness of the user entered metadata.

In various embodiments, confidence scores can be determined based on statistical models. As noted supra, statistical models can utilize various schemes and/or systems (e.g., support vector machines, neural networks, expert systems, Bayesian belief networks, fuzzy logic, data fusion engines, etc.). Confidence scores can be represented as a number representing a probability of correctness, a token rating (e.g., four stars out of five), a relative ranking (e.g., first, second, third, etc.), or the like. It is noted that various naming conventions can be utilized to represent confidence scores. It is noted that confidence scores can be weighted based on configurable criteria. For example, an emphasis can be placed on video, audio, identifiable images, and the like.

In some embodiments, metadata having the highest associated confidence score can be automatically selected. In various other embodiments, confidence scores can be presented to a user with associated metadata. A user can select metadata based on a user's subjective analysis and/or objective analysis of confidence component 350.

In various aspects, confidence component 350 can determine confidence scores for key words/phrases or portions of suggested titles. A list of default preambles, basic descriptors, or the like can be generate (e.g., by suggestion component 330) for the metadata. The default preambles or basic descriptors can comprise, for example, terms such as "best of," "highlights from," "funniest parts of," "top songs of," "top videos of," and the like. In some embodiments, confidence component 350 can include the default preambles or basic descriptors when determining confidence scores. In other embodiments, confidence component 350 can ignore the default preambles or basic descriptors when determining confidence scores. For example, the default preambles or basic descriptors can be presented to a user without confidence scores, while other metadata is presented to a user with the associated confidence scores. The user can then select the basic descriptors to utilize with the suggested metadata.

In embodiments, confidence component 350 can determine confidence scores based in part on a history associated with individual users or groups of users. In an aspect, confidence component 350 can utilize a history of user selection of suggested metadata and/or user input associated with metadata to generate a weighted confidence score.

Figure 4:
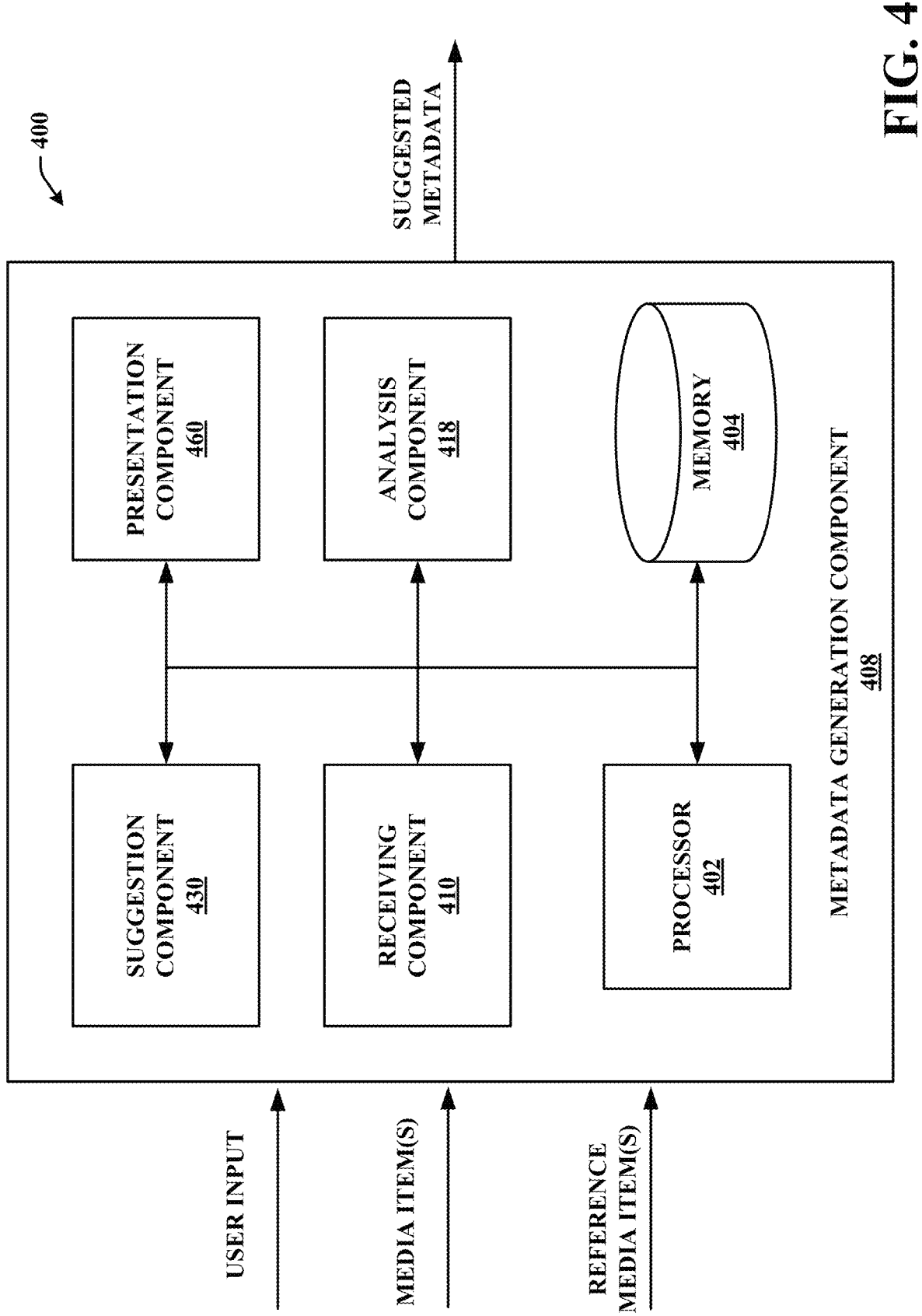
FIG. 4 illustrates a high-level block diagram of an example system that can present generated suggested metadata and confidence scores for the suggested metadata in accordance with certain embodiments of this disclosure.

Referring now to FIG. 4, system 400 is depicted. System 400 can present generated suggested metadata and confidence scores for the suggested metadata. System 400 can include all or portions of other systems as described previously, or other systems or components detailed herein.

System 400 can include a memory 404 that stores computer executable components and a processor 402 that executes computer executable components stored in the memory 404. It is to be appreciated that the system 300 can be used in connection with implementing one or more of the systems or components shown and described in connection with other figures disclosed herein. It is noted that all or some aspects of system 400 can be comprised in larger systems such as servers, computing devices, smart phones, and the like. As depicted, system 400 can include a metadata generation component 408 that primarily includes a receiving component 410 (which can receive media items and user input), an analysis component 418 (which can identify matching media items and/or generate classifications), a suggestion component 430 (which can generate suggested metadata), and a presentation component 460 (which can render suggested metadata and/or confidence scores). It is noted that similarly named components of system 400 and other systems disclosed herein can include similar functionality unless context suggests otherwise.

Presentation component 460 can render or facilitate rendering of suggested metadata and/or confidence scores. In some embodiments, the presentation component 460 can be comprised wholly or partly on a user equipment device. In other embodiments, presentation component 460 can be comprised wholly or partly on a separate device (e.g., such as a server). It is noted that presentation component 460 can comprise an interface capable of receiving input, an interface capable of rendering output, or can instruct an interface to render output.

Figure 5A:
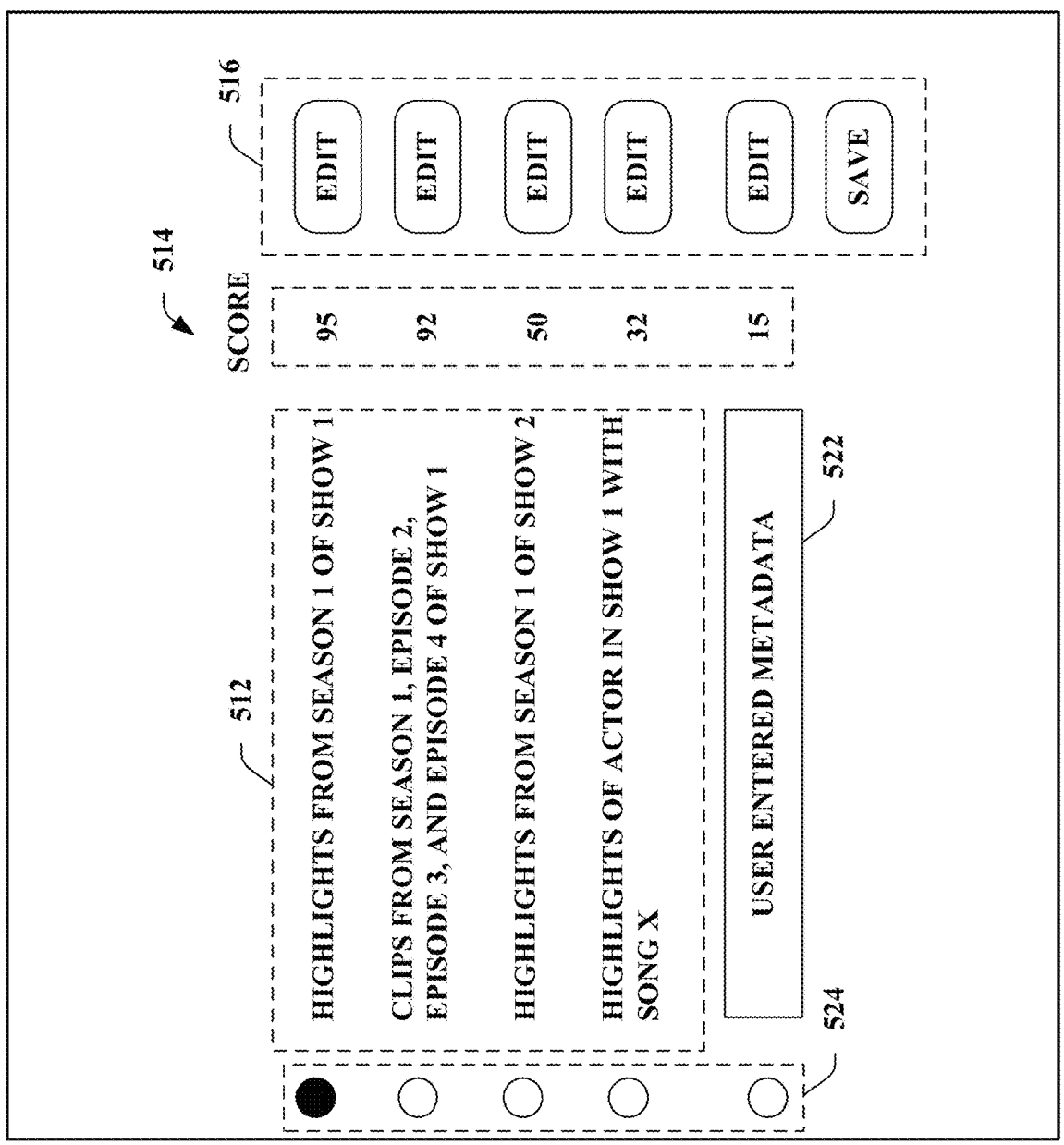
FIGS. 5A-5C illustrate high-level block diagrams of example interfaces that can facilitate rendering of suggested metadata and/or associated confidence scores in accordance with certain embodiments of this disclosure.
Figure 5:
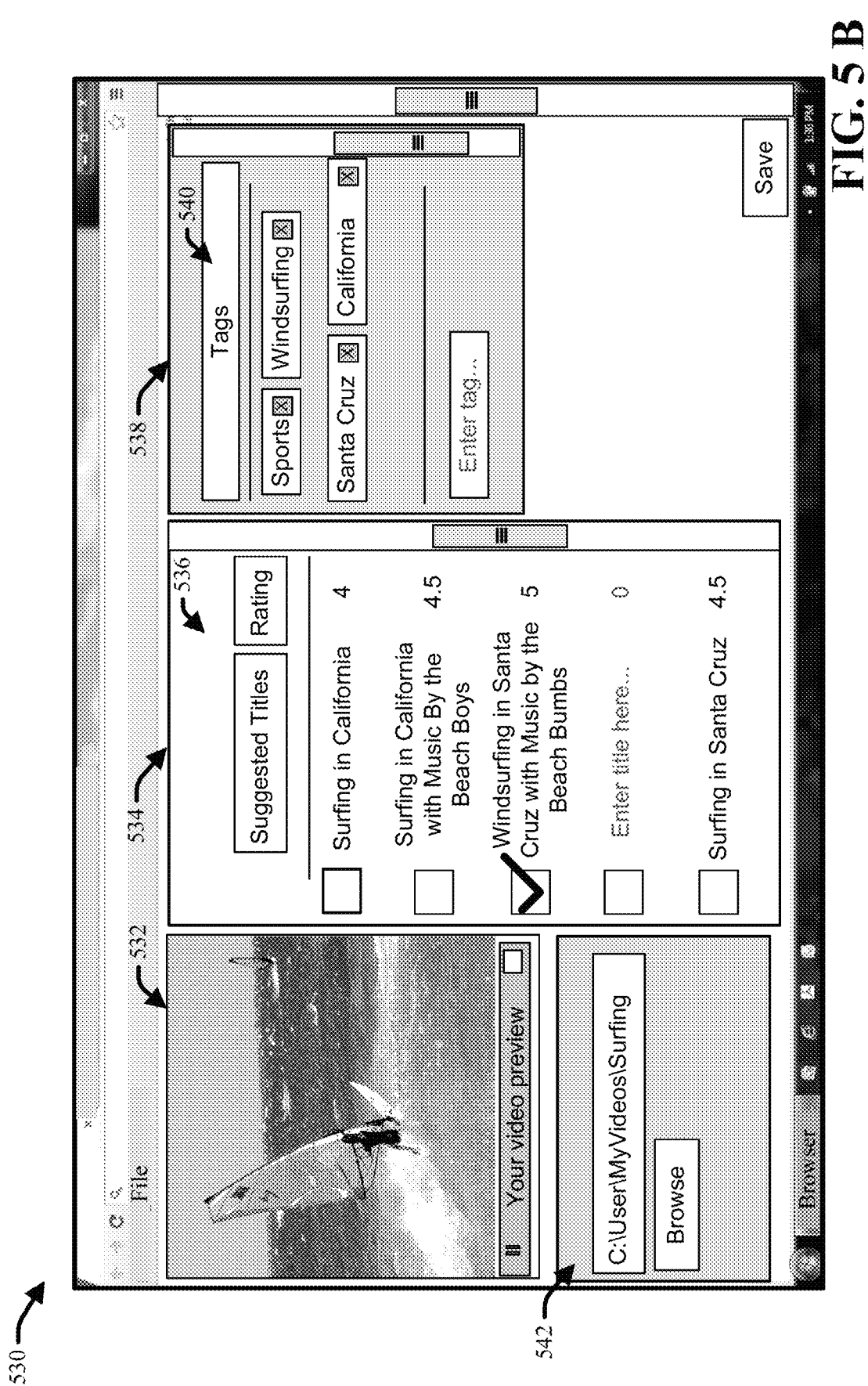
Figure 5:

Turning to FIG. 5A with reference to FIG. 4, there illustrated is an exemplary interface 500. Presentation component 460 can render or facilitate rendering of interface 500. Interface 500 can primarily comprise suggested metadata 512, confidence scores 514, editing options 516, user generated metadata 522, and selection controls 524. It is noted that interface 500 is an exemplary interface, as such, interface 500 can comprise alternative content, various presentation formats, and/or other controls. As such, interface 500 is not limited to the format and content presented in FIG. 5.

In an aspect, presentation component 460 can facilitate rendering of suggested metadata 512. While four suggested titles are presented, it is noted that presentation component 460 can render a different number of suggested titles, suggested key words/phrases, suggested tags, or other suggested metadata. In another aspect, presentation component 460 can render a pre-populated list of default descriptors for selection (e.g., "best of," "highlights from," etc.). In some embodiments, receiving component 510 can receive user selection of metadata (e.g., based on selection controls 524). Selected metadata can be utilized for a media item. In another aspect, suggestion component 430 can monitor selections and utilize selections to determine confidence scores for future suggested media content. In embodiments, confidence scores can be weighted for particular users or groups of users based on the past selections (e.g., more weight given to particular default descriptors based on past selections).

In embodiments, presentation component 460 can select one or more suggested titles, tags, key words/phrases, or other metadata for display. In an example, presentation component 460 can select a predetermined number of suggested metadata fields (e.g., four, five, etc.). In another aspect, presentation component 460 can select a number of different suggest metadata items based on a characteristic of an interface and/or a user settings. For example, a user setting can indicate a defined number of different suggest metadata items that should be presented. In another example, presentation component 460 can determine a size of a display interface or type of user equipment device and can select the number of different suggest metadata items based on the display interface or type of user equipment device (e.g., a mobile device may have less metadata items compared to a desktop computing device). In an aspect, presentation component 460 can select the metadata items based on confidence levels of the suggested metadata items. For example, the highest five metadata items can be selected for presentation.

In another aspect, presentation component 460 can select suggested metadata items having confidence scores meeting a defined threshold. For example, presentation component 460 can select all suggested metadata items having confidence scores meeting a defined threshold and can display the selected metadata items. In another aspect, a defined number of the selected metadata items can be selected and presented.

In another aspect, presentation component 460 can facilitate rendering of confidence scores 514 associated with respective suggested metadata and/or user generated metadata 522. While depicted as numerical confidence scores, it is appreciated that the confidence scores 514 can be represented according to various other naming conventions (e.g., tokens, stars, etc.).

Editing options 516 can be selected to enable user editing of suggested metadata and/or user edited metadata. In an aspect, the user can provide input to edit the suggested metadata to a desired title. The user can then provide input (e.g., selecting a save control) to utilize a selected title.

Turning now to FIG. 5B with reference to FIG. 4, there illustrated is an exemplary interface 530. Presentation component 460 can render or facilitate rendering of interface 530. Interface 530 can primarily comprise a preview component 532, a suggested title component 534, a suggested tag component 538, and a file selection component 542. It is noted that interface 530 is an exemplary interface, as such, interface 530 can comprise alternative content, various presentation formats, and/or other controls. In one aspect, interface 530 can represent a display rendered by a desk top computer, laptop computer, set top box, or the like.

In an aspect, a user can select a media item, such as a video, through the file selection component 420. A media item can be located based on a location in a file directory or the like. Once selected, the media item can be uploaded and received (e.g., via receiving component 410). A preview 532 of the media item can be presented (e.g., via presentation component 460). The preview can be playable, editable, and the like.

The suggested title component 534 can comprise a set of suggested titles and ratings 536. In an aspect, the set of suggest titles and ratings 534 can comprise one or more suggested titles and associated confidence scores (e.g., ratings). In an aspect, the titles can be based on content analysis of a media item, user input, a location of a media item (e.g., location in a file directory), original title of a media item, video/audio fingerprinting, and the like.

In another aspect, the suggested tags component 538 can comprise a set of tags 540 that can be generated based on various aspects. It is noted that the tags can be generate based on similar factors as titles. It is noted that other criteria can be utilized to generate tags, such as a limited number of characters, a pre-populated list, a limited number of words, and the like.

Turning to FIG. 5C with reference to FIG. 4, there illustrated is an exemplary interface 560. Presentation component 460 can render or facilitate rendering of interface 560. Interface 560 can primarily comprise preview 562, user title field 564, suggested metadata 566, and settings controls 568. It is noted that interface 560 is an exemplary interface, as such, interface 500 can comprise alternative content, various presentation formats, and/or other controls. In an aspect, interface 560 can represent an interface of a mobile device, such as a smart phone, tablet, PDA, or the like.

A user can capture a media item or otherwise select a media item for uploading. The media item can presented in as a preview 562. The preview 562 can represent a preview of the media item prior to publishing of the media item. A user can provide input to cause the preview to play the media item.

In one or more embodiments, a user can provide their own title in a user title field 564. The user title field 564 can receive input such as text. In an aspect, the suggested metadata 566 can be based in part on user provided text. In various embodiments, the suggested metadata 566 can be selected as titles, tags, or the like for a media item.

In another aspect, settings controls 568 can facilitate management of settings associated with automatic generation of metadata. For example, a user can provide input to turn on/off automatic generation of metadata, automatic selection of metadata, and the like.

While the above example illustrates generating suggested metadata in media item sharing systems, it is noted that suggested metadata can be generated in various other systems. For example, users can capture media items or otherwise generate media items via a computing device and can be presented with with suggested metadata in a mobile application ("apps") network, a social network, a blogging network, a news service network, or virtually any other network.

Figure 6:
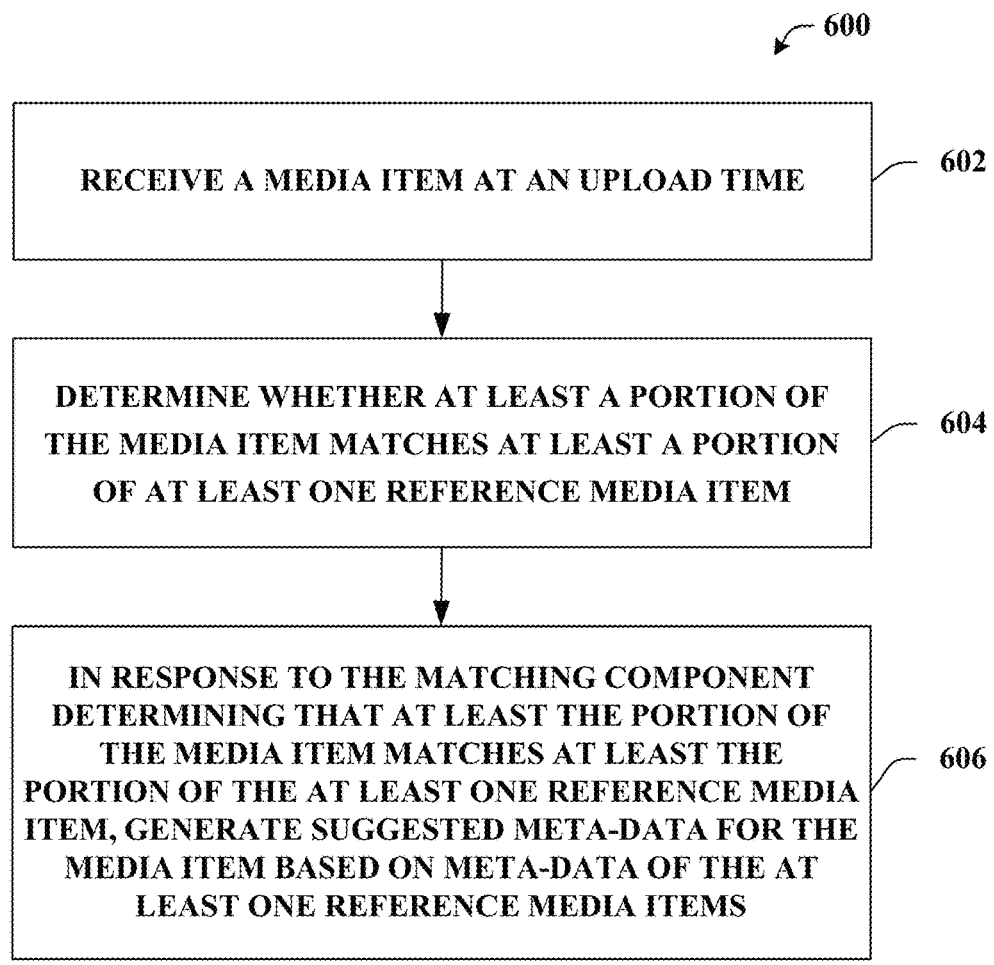
FIG. 6 illustrates an example methodology that provide for generation of searchable metadata for a media item in accordance with certain embodiments of this disclosure.
Figure 7:
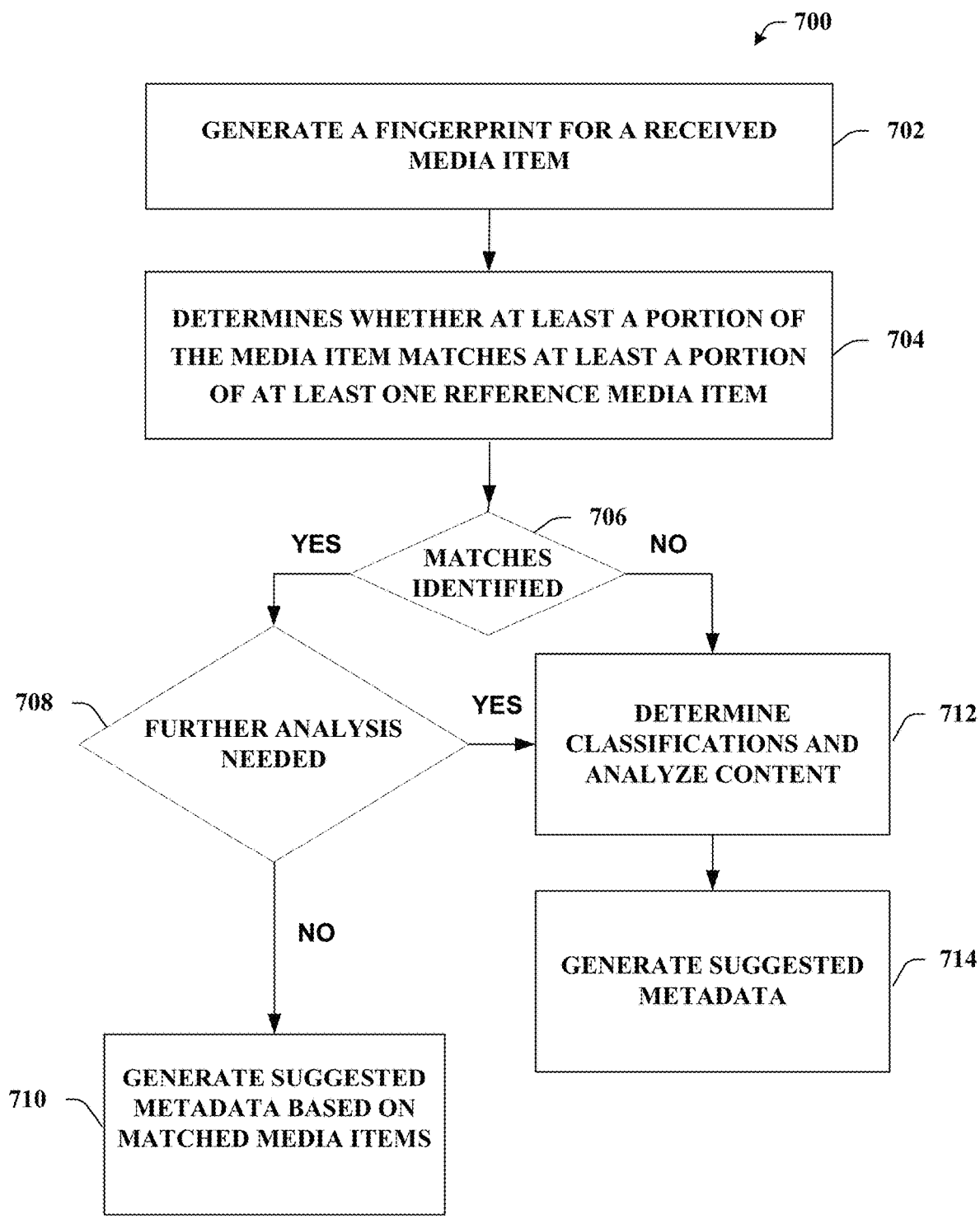
FIG. 7 illustrates an example methodology that can generating suggested metadata based on matching reference media items and/or classifications of media content in accordance with certain embodiments of this disclosure.
Figure 8:
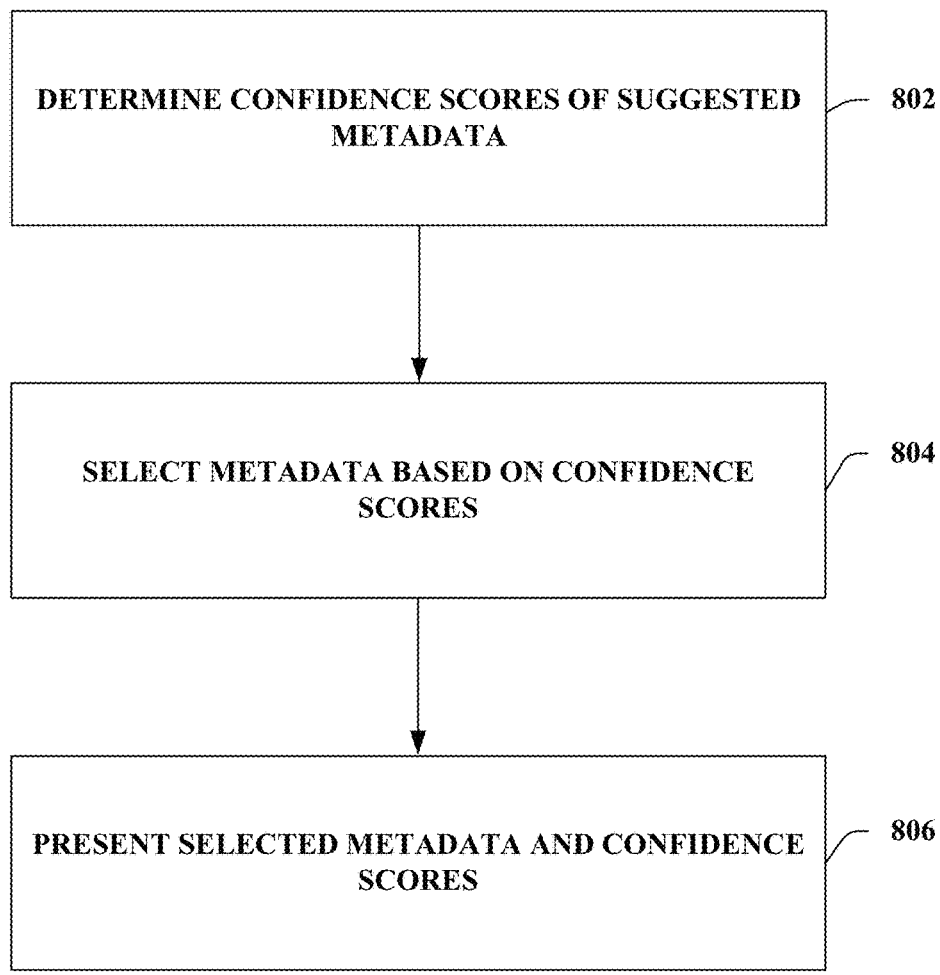
FIG. 8 illustrates an example methodology that can provide for determining confidence scores associated suggested metadata in accordance with certain embodiments of this disclosure.

FIGS. 6-8 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 6-8 can be performed by various systems disclosed herein, such as systems 100, 200, 300, and 400. In another aspect, FIGS. 6-8 can facilitate rendering of interface 500.

FIG. 6 illustrates exemplary method 600. Method 600 can facilitate generation of searchable metadata for a media item. In another aspect, the method 600 can generate one or more suggested metadata items, such as titles, tags, key words, and the like.

At reference numeral 602, a system can receive (e.g., via receiving component 110) a media item at an upload time. For example, a user can upload or facilitate uploading of a media item to the system via a user equipment device. In some embodiments, the system can receive the media item at other times and from other sources, such as a media store. It is noted that "at an upload time," can refer to an approximate time that may be delayed to an actual upload time due to limitations of user equipment devices and/or other devices.

At 604, the system can determine (e.g., via matching component 120) determine whether at least a portion of the media item matches at least a portion of at least one reference media item. Determining whether a portion of the media item matches a portion of another media item can be based on comparison of respective fingerprints or sub-fingerprints. In some embodiments, comparison can channel based (e.g., audio, video, etc.). In another aspect, the system can determine whether the entire media item matches at least a portion of a reference media item, whether portions of the media item match portions of reference media items, and the like.

At 606, the system can, in response to the matching component determining that at least the portion of the media item matches at least the portion of the at least one reference media item, generate (e.g., via suggestion component 130) suggested meta-data for the media item based on meta-data of the at least one reference media items. For example, metadata from a matching reference media item can be copied and utilized as suggested metadata for the media item. In some embodiments, portions of metadata from the matching reference media item can be copied and utilized as suggested metadata for the media item. It is noted that the system can utilize metadata from multiple matching reference media items to generate the suggested metadata for the media item.

Turning now to FIG. 7, exemplary method 700 is depicted. Method 700 can provide for generating suggested metadata based on matching reference media items and/or classifications of media content. For example, the method 700 can provide for analyzing media items to determine classifications related to content of the media items and generating suggested metadata based at least in part on the classifications.

At reference numeral 702, a system can generate (e.g., via matching component 220) a fingerprint for a received media item. It is noted that the fingerprint can be generated via one or more techniques of methods. In an aspect, the system can generate multiple fingerprints and/or sub-fingerprints for the received media item. In some embodiments, the system can receive the fingerprint from another system, storage device, or the like.

At reference numeral 704, a system can determine (e.g., via matching component 220) whether at least a portion of the media item matches at least a portion of at least one reference media item. For example, the system can compare a fingerprint or sub-fingerprint of the media item with fingerprints or sub-fingerprints of one or more reference media items. The comparison can be a bitwise comparison or the like. In some embodiments, the system can determine a similarity score, measure of similarity, or other metric that defines a level of matching, such as a standard deviation. If the metric meets a defined threshold, the system can determine that the media items (or portions thereof) match.

At reference numeral 706, if the determines at least a partial match exits, method 700 can continue at reference numeral 708. If the system determines that no matches exist, the method 700 can continue at 712.

At reference numeral 708, a can determine system (e.g., via matching component 220) whether a further analysis of a media item is needed. For example, the system can determine if at least a portion of the received media item does not match with any reference media item and the method can continue at reference numeral 712. As another example, the system can determine that a confidence score of matched media items is below a threshold and the method can continue at reference numeral 712. If the system determines that further analysis is not needed the system can continue at 710.

At reference numeral 710, a system can generate (e.g., via suggestion component 230) suggested metadata based on the matched media items. For example, the system can generate, based on metadata of the matched media items, one or more titles, a summary titles, key words/phrases, tags, or the like.

At reference numeral 712, a system can determine (e.g., via classification component 240) classifications based on analysis of the media item. In various embodiments, the system can analyze the media item content, such as video, audio, images, or the like. In an aspect, the system can train a classifier and/or utilized a trained classifier to identify high level concepts, such as recognition of a type or genre of music, recognition of a sport, logo, or other visual aspect, and the like.

In some embodiments, if a portion of a media item is matched to a reference media item, or portion thereof, the portion of the media item may not be classified and/or analyzed at reference numeral 712. In one aspect, the portion can be associated with metadata of a reference media item.

At reference numeral 714, a system can generate (e.g., via suggestion component 230) suggested metadata based on matched media items or classifications. In embodiments, the system can generate inferences to identify a common aspect, theme, or feature of matched media items and classifications. For example, the system can determine that the matched media items and classifications all related to "classical music performances," and can generate suggested metadata based on the identified feature. In another aspect, the system can generate suggested metadata based only on a classification or only on matched media items. For example, if a confidence score associated with a classification or matched media item is below a threshold (e.g., a pre-determined threshold, a threshold based on comparison of confidence scores, etc.) then the other of the classification or matched media item can be utilized.

Turning now to FIG. 8, example method 800 is illustrated. Method 800 can provide for determining confidence scores associated suggested metadata. For example, the method 800 can provide for determining confidence scores associated with metadata and selected the metadata, based on the confidence scores, for display and/or use.

At 802, a system can determine (e.g., via confidence component 350) confidence scores of suggested metadata and/or user generated metadata. For example, confidence scores can be determined based on a probabilistic calculation or the like. In an aspect, the confidence scores can be weighted to emphasize one or more aspects. The confidence scores can reflect a level of confidence in the correctness or appropriateness of the suggested metadata and/or user generated metadata.

At 804, a system can select (e.g., via suggestion component 330) metadata based on the confidence scores. In an aspect, the system can select metadata, having the highest confidence score, and automatically associated the metadata with a media item. In another aspect, one or more metadata items can be selected based on their respective confidence scores.

At 806, a system can present (e.g., via presentation component 460) selected metadata and confidence scores. For example, the system can facilitate generation of a rendering, such as interface 500. In an aspect, a user can provide input regarding a selection and/or alteration of the presented metadata. In some embodiments, if a user alters metadata, a confidence score can be updated for the altered metadata, such as at reference numeral 804.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
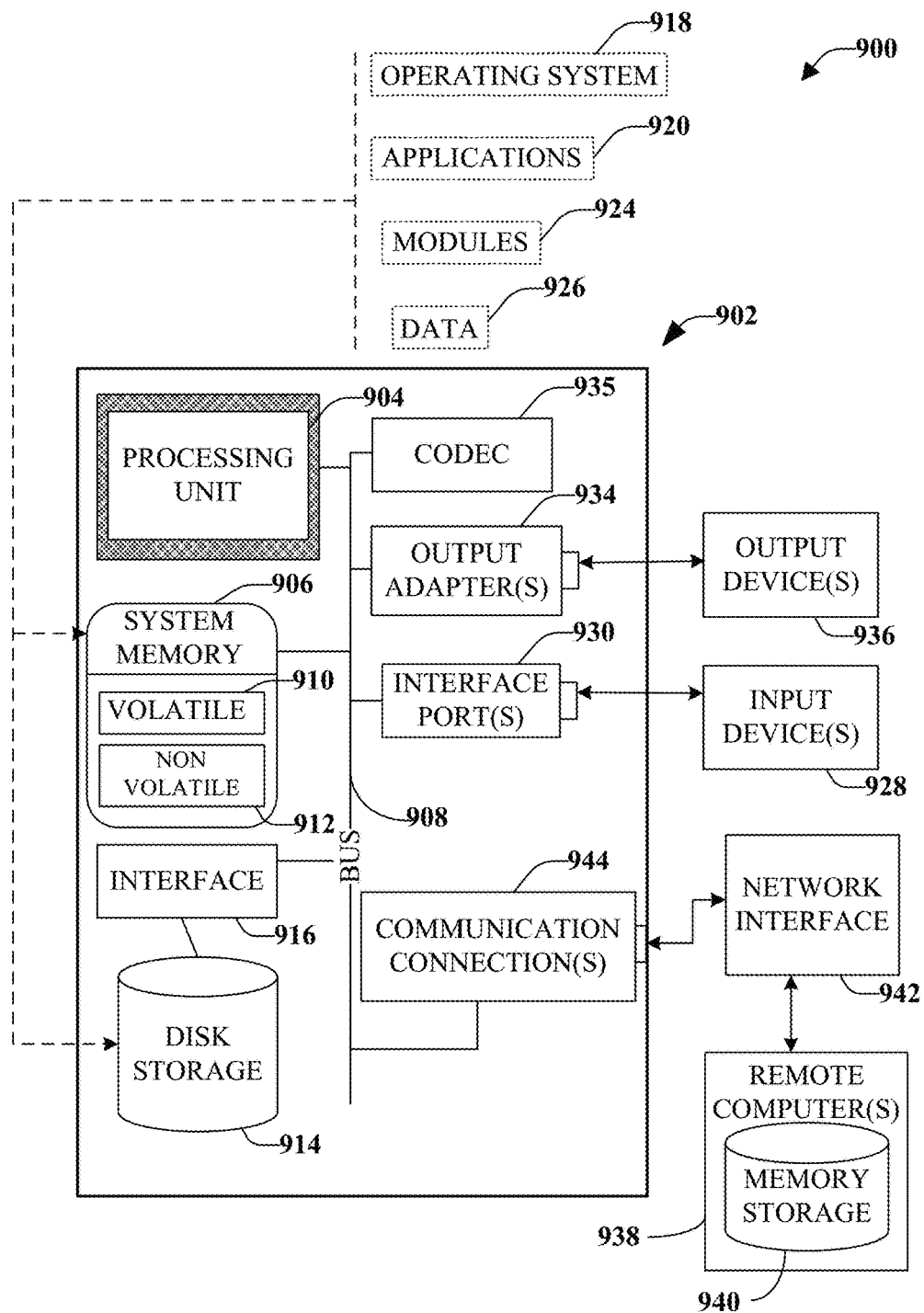
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
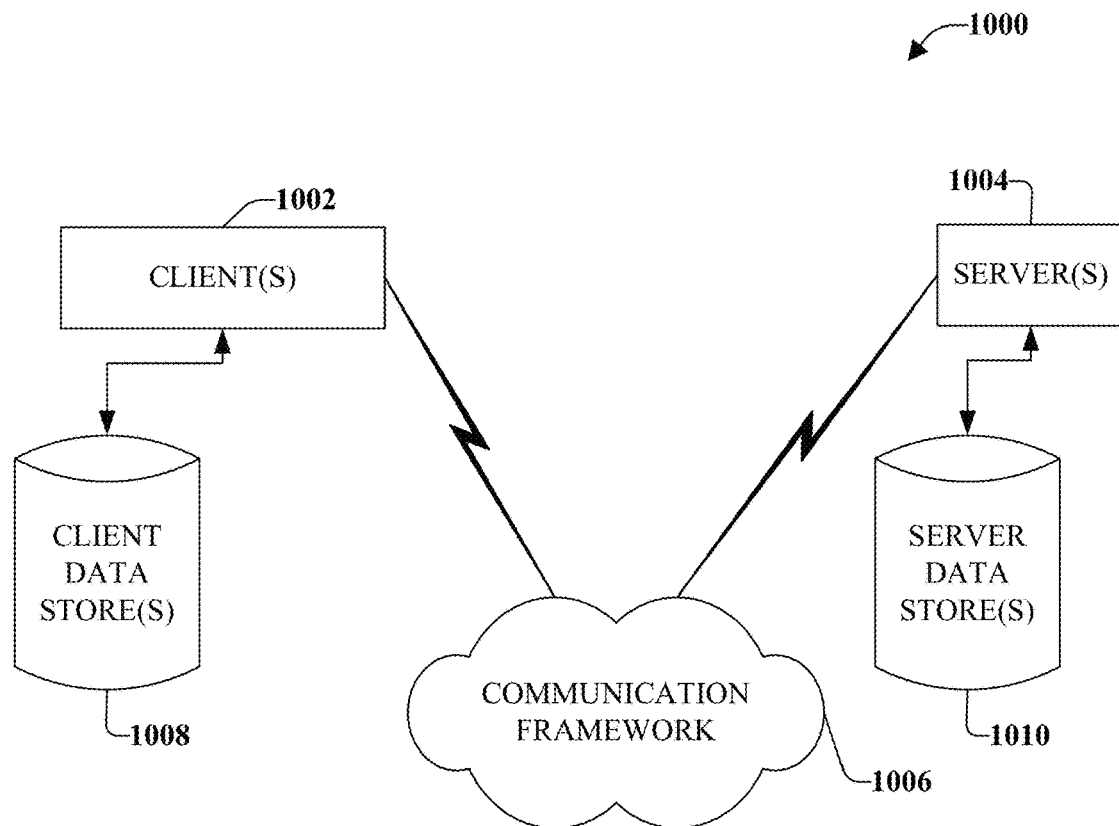
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system comprising:
    a computer-readable storage media having stored thereon computer executable instructions; and
    a hardware processor that, when executing the computer executable instructions stored in the computer-readable storage media, is configured to:
        automatically select previously uploaded media content items from a plurality of stored media content items as candidates for updating associated metadata with updated metadata by determining that each of the previously uploaded media content items have not appeared as a search result within a particular number of top search results in searches for at least one of the stored media content items;
        for each selected media content item of the previously uploaded media content items that were automatically selected as the candidates for updating the associated metadata with updated metadata:
            generate a plurality of fingerprints that represent at least a portion of the selected media content item;
            determine whether at least a portion of the selected media content item matches at least a portion of a reference media content item from a database of reference media content items by comparing the plurality of fingerprints to a plurality of reference fingerprints associated with each of the reference media content items;
            in response to determining that at least the portion of the selected media content item matches a plurality of reference media content items, retrieve reference metadata associated with the plurality of reference media content items;
            generate a plurality of suggested title metadata items for the selected media content item based on the retrieved reference metadata of the plurality of reference media content items, wherein each of the plurality of suggested title metadata items is associated with a confidence score;

generate a user interface that presents a portion of the plurality of suggested title metadata items for the selected media content item based on the confidence score and includes an option to modify the selected media content item with the portion of the plurality of suggested title metadata items;

receive a suggested title metadata item that has been selected from the portion of the plurality of suggested title metadata items presented in the user interface; and update the selected media content item with the suggested title metadata item and update the confidence score associated with the suggested title metadata item.

2. The system of claim 1, wherein the hardware processor is further configured to determine whether the at least the portion of the selected media content item matches the at least the portion of the reference media content item based on matching a first fingerprint representing the at least the portion of the selected media content item with a second fingerprint representing the at least the portion of the reference media content item.

3. The system of claim 1, wherein the hardware processor is further configured to:

generate confidence scores of the plurality of suggested title metadata items associated with each of the plurality of reference media content items.

4. The system of claim 3, wherein the hardware processor is further configured to generate the confidence scores based on a measure deviation between fingerprint matching of fingerprints respectively associated with the selected media content item and each of the plurality of reference media content items.

5. The system of claim 1, wherein the hardware processor is further configured to generate the plurality of suggested title metadata items based on first metadata associated with a first reference media content item and second metadata associated with a second reference media content item.

6. The system of claim 5, wherein the hardware processor is further configured to generate the plurality of suggested title metadata items based on identifying a common characteristic between at least the first reference media content item and the second reference media content item.

7. The system of claim 6, wherein the hardware processor is further configured to identify the common characteristic as at least one of a common series associated with the reference media content item, subject associated with the reference media content item, person associated with the reference media content item, or audio associated with the reference media content item.

8. The system of claim 5, wherein the hardware processor is further configured to generate the plurality of suggested title metadata items based on at least one of a threshold number of characters or a threshold number of each of the plurality of reference media content items.

9. The system of claim 1, wherein the hardware processor is further configured to:

in response to determining that the at least the portion of the selected media content item does not match at least the portion of the reference media content item, identify a feature or classification of the selected media content item, wherein the plurality of suggested title metadata items for the selected media content item are generated based on at least one of the feature or the classification.

10. The system of claim 9, wherein the hardware processor is further configured to identify the feature based on classifying at least a portion of video or audio of the selected media content item.

11. The system of claim 9, wherein hardware processor is further configured to identify the feature of the selected media content item based on an analysis of data associated with storage of the selected media content item.

12. The system of claim 1, wherein the hardware processor is further configured to generate the plurality of suggested title metadata items as at least a portion of a title for the selected media content item.

13. A method, comprising:

automatically selecting, by a system comprising a processor, previously uploaded media content items from a plurality of stored media content items as candidates for updating associated metadata with updated metadata by determining that each of the previously uploaded media content items have not appeared as a search result within a particular number of top search results in searches for at least one of the stored media content items;

for each selected media content item of the previously uploaded media content items that were automatically selected as the candidates for updating the associated metadata with updated metadata:

generating, by the system, a plurality of fingerprints that represent at least a portion of the selected media content item;

determining, by the system, whether at least a portion of the selected media content item matches at least a portion of a reference media content item from a database of reference media content items by comparing the plurality of fingerprints to a plurality of reference fingerprints associated with each of the reference media content items;

in response to determining that at least the portion of the selected media content item matches a plurality of reference media content items, retrieve reference metadata associated with the plurality of reference media content items;

generating, by the system, a plurality of suggested title metadata items for the selected media content item based on the retrieved reference metadata of the plurality of reference media content item, wherein each of the plurality of suggested title metadata items is associated with a confidence score;

generating, by the system, a user interface that presents a portion of the plurality of suggested title metadata items for the selected media content item based on the confidence score and includes an option to modify the selected media content item with the portion of the plurality of suggested title metadata items;

receiving, by the system, a suggested title metadata item that has been selected from the plurality of the plurality of suggested title metadata items presented in the user interface; and updating, by the system, the selected media content item with the suggested title metadata item and updating the confidence score associated with the suggested title metadata item.

14. The method of claim 13, further comprising generating one or more suggested titles for the selected media content item based on a title associated with each of the plurality of reference media content items.

15. The method of claim 13, further comprising identifying a portion of content associated with the selected media content item that matches the reference media content item and generating one or more suggested titles based on the portion of content.

16. The method of claim 14, further comprising:
in response to generating the one or more suggested titles, initiating a rendering of the one or more suggested titles.

17. The method of claim 14, further comprising:
in response to generating the one or more suggested titles, selecting suggested titles of the one or more suggested titles for presentation in the user interface based on respective confidence scores of the one or more suggested titles.

18. A non-transitory computer readable storage medium comprising computer-executable instructions that, when executed by a processor, cause the processor to perform a method, the method comprising:
automatically selecting previously uploaded media content items from a plurality of stored media content items as candidates for updating associated metadata with updated metadata by determining that each of the previously uploaded media content items have not appeared as a search result within a particular number of top search results in searches for at least one of the stored media content items;
for each selected media content item of the previously uploaded media content items that were automatically selected as the candidates for updating the associated metadata with updated metadata:
generating a plurality of fingerprints that represent at least a portion of the selected media content item;
determining whether at least a portion of the selected media content item matches at least a portion of a reference media content item from a database of reference media content items by comparing the plurality of fingerprints to a plurality of reference fingerprints associated with each of the reference media content items;
in response to determining that at least the portion of the selected media content item matches a plurality of reference media content items, retrieving reference metadata associated with the plurality of reference media content items;
generating a plurality of suggested title metadata items for the selected media content item based on the retrieved reference metadata of the plurality of reference media content items, wherein each of the plurality of suggested title metadata items is associated with a confidence score;
generating a user interface that presents a portion of the plurality of suggested title metadata items for the selected media content item based on the confidence score and includes an option to modify the selected media content item with the portion of the plurality of suggested title metadata items;
receiving a suggested title metadata item that has been selected from the plurality of the plurality of suggested title metadata items presented in the user interface; and
updating the selected media content item with the suggested title metadata item and updating the confidence score associated with the suggested title metadata item.

19. The non-transitory computer readable storage medium of claim 18, the method further comprising:
generating an identification tag for the selected media content item based on metadata associated with each of the plurality of reference media content items.

20. The non-transitory computer readable storage medium of claim 18, the method further comprising:
generating a set of identification tags based on matching the selected media content item to a set of reference media content items comprising the reference media item and at least one other media item.

21. The non-transitory computer readable storage medium of claim 20, wherein the method further comprises:
selecting an identification tag from the set of identification tags based on a selection criterion.

* * * * *